United States Patent [19]
Cho

[11] Patent Number: 5,800,007
[45] Date of Patent: Sep. 1, 1998

[54] VEHICLE DOOR IMPACT ABSORPTION APPARATUS

[75] Inventor: Kuk-Hyun Cho, Ansan, Rep. of Korea

[73] Assignee: Hyundai Motor Company, Seoul, Rep. of Korea

[21] Appl. No.: 763,047

[22] Filed: Dec. 10, 1996

[30]   Foreign Application Priority Data

Dec. 12, 1995 [KR] Rep. of Korea ............ 1995-48689

[51] Int. Cl.$^6$ ............................................. B60J 5/04
[52] U.S. Cl. ................. 296/146.6; 296/188; 49/503
[58] Field of Search ................ 296/146.6, 146.5, 296/188, 189, 202; 49/502, 503

[56]   References Cited

U.S. PATENT DOCUMENTS

| | | | |
|---|---|---|---|
| 4,013,317 | 3/1977 | Reidelbach et al. | 296/188 X |
| 5,137,325 | 8/1992 | Ohya | 296/188 |
| 5,470,125 | 11/1995 | Yamazaki | 296/146.6 |
| 5,518,290 | 5/1996 | Reinhard et al. | 296/188 X |
| 5,599,057 | 2/1997 | Hirahara et al. | 296/146.6 |

FOREIGN PATENT DOCUMENTS

| | | | |
|---|---|---|---|
| 2698322 | 5/1994 | France | 296/188 |
| 4240416 | 9/1993 | Germany | 296/146.6 |

*Primary Examiner*—Joseph D. Pape
*Attorney, Agent, or Firm*—Christie, Parker & Hale, LLP

[57]   ABSTRACT

The present invention relates to a vehicle door impact absorption apparatus by which side impacts can be restricted during side impact intrusions to thereby provide increased protection for the vehicle occupants, the apparatus comprising two hollow supporting bars for inherently being disposed with a coil spring at an interior of a center pillar and for being resiliently inserted to thereby be fixed by a stopper protruded outside of a center pillar outer panel in order to reinforce a bracket facing a center pillar out of brackets which couple both tip ends of a door impact beam lengthwise disposed within front/rear doors to left/right tip end portions of an inner panel.

23 Claims, 4 Drawing Sheets

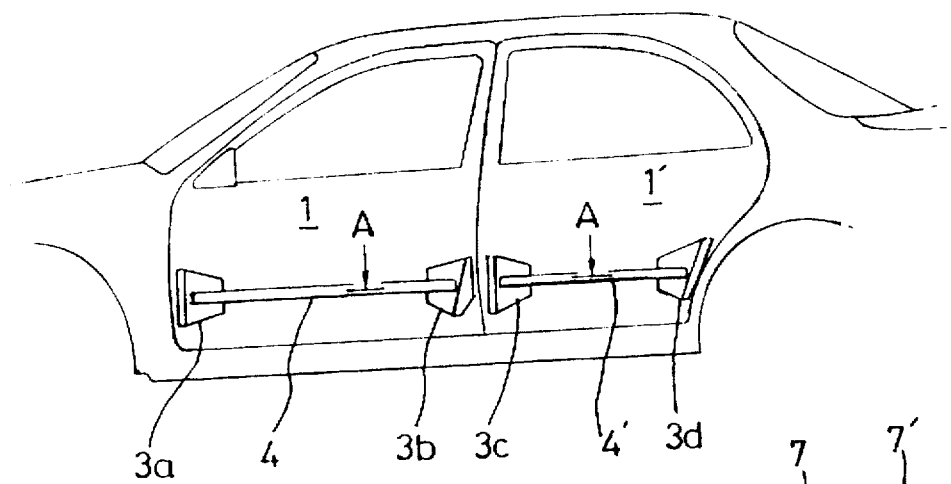
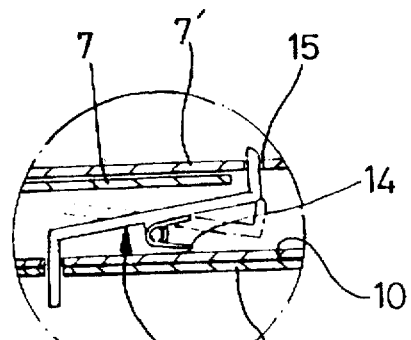
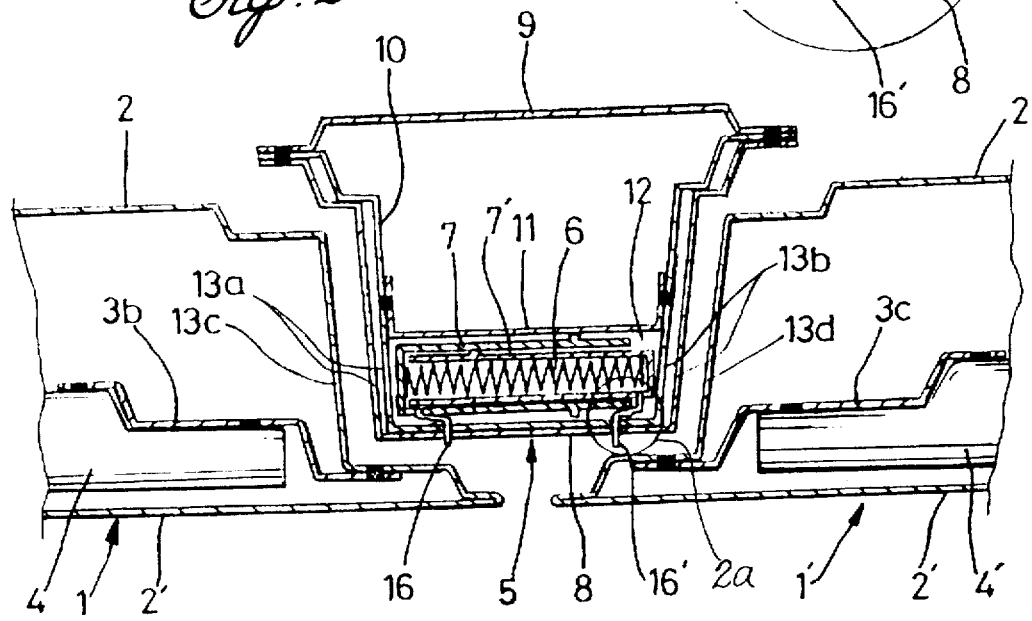

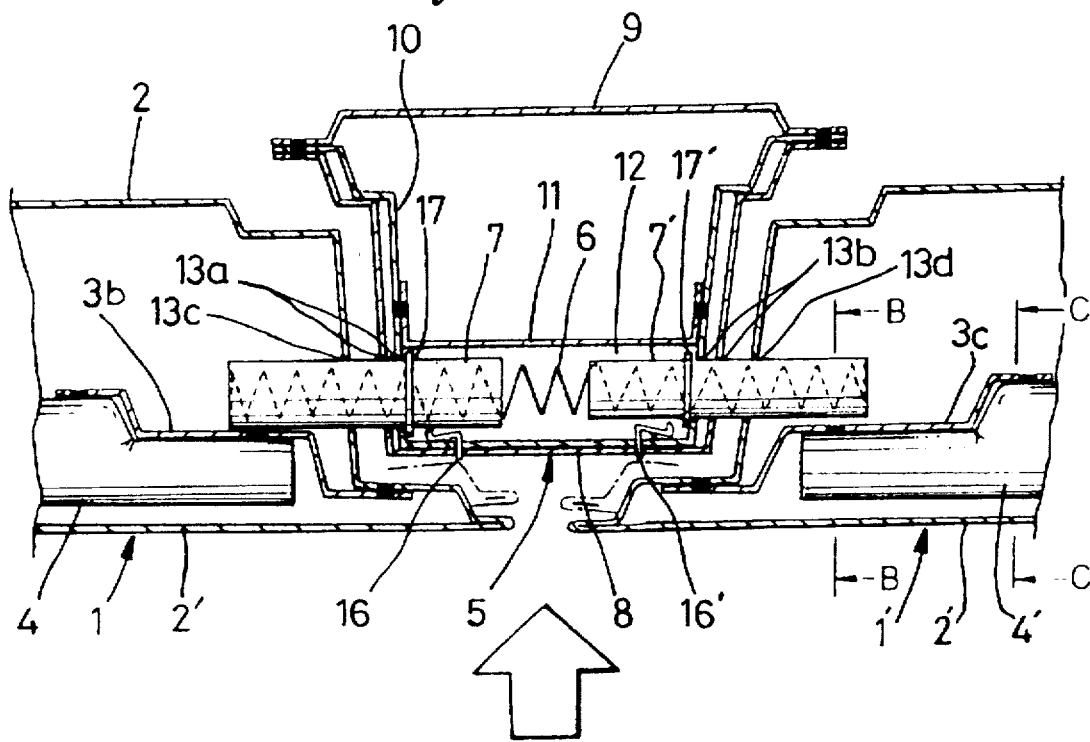
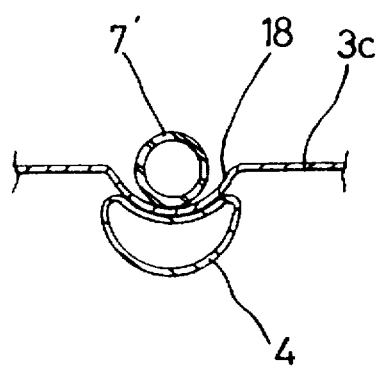
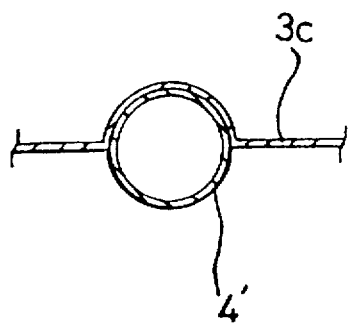

VEHICLE DOOR IMPACT ABSORPTION APPARATUS

BACKGROUND OF THE INVENTION

1. Field of the Invention

The present invention relates to a vehicle door impact absorption apparatus.

2. Description of the Prior Art

Generally, most motor vehicle doors include an outer door panel and an inner door panel with a door cavity spaced in between them. A door impact beam is then placed between the two panels.

The door impact beam 101 according to the prior art has both ends welded to the inner door panels 103 of the front and rear doors 102 and 102' by means of a bracket 104, as illustrated in FIG. 6.

The door impact beam 101 is a reinforced member that structurally reinforces the front and rear doors 102 and 102' to provide increased protection for the occupants when subjected to side impact collisions.

Although the door impact beam 101 is generally made of a pipe of high tension, the bracket 104 supporting the door impact beam 101 usually has less structural strength than the door impact beam 101 because of interference from the inner door panel 103 when placed within the front and rear doors 102 and 102'.

Accordingly, there is a problem in that when the door impact beam 101 absorbs the impact during a side impact collision, the bracket 104 is deformed before the inner door panel 103. At the same time, both lateral surfaces of the doors 102 and 102' graze a center pillar 106 causing it to be bent. The side impact intrusion is therefore not effectively prevented, creating a risk to the passengers in the motor vehicle.

Another impact or intrusion resistant device is disclosed by the Japanese application No. Sho 50-7613. FIG. 7 shows a motor vehicle with a reinforced door mechanism disclosed in the Japanese application. FIG. 8 is an expanded view of this reinforced door mechanism.

The Japanese art discloses a reinforced door mechanism on a vehicle with a door body 201 which employs a bar 203 that can be inserted horizontally and that can provide elastic force towards a hinge 202.

A pillar, placed at a lateral surface towards the hinge, has a concave guide surface 204 for guiding one end of the bar 203 to be inserted into the concave surface and protruded when fitted to a sectional surface of the hinge, at the bar 203, allowing the opening and closing of the door.

A latching unit 205 near the other end of the bar 203, protruded in time for a door to close, is located at a pillar situated far from the hinge 202.

However, there is a problem in the vehicle door equipped with the reinforced mechanism described above. Protection of the vehicle occupants cannot be provided because the impact applied to the door during side impact collisions cannot be distributed to the center pillar and be absorbed by it.

SUMMARY OF THE INVENTION

Accordingly, the present invention is presented to solve this problem. It is an object of the present invention to provide a vehicle door impact absorption apparatus by which a deformation of a bracket supporting both tip ends of a door impact beam by selectively being protruded into a door cavity during the side impact collision can be resisted and the impact can be distributed to the center pillar to thereby provide a safety protection to the vehicle occupants from a side impact intrusion.

In accordance with the object of the present invention, there is provided a vehicle door impact absorption apparatus, the apparatus comprising two hollow supporting bars for inherently being disposed with a coil spring at an interior of a center pillar and for being resiliently inserted to thereby be fixed by stoppers protruded outside of a center pillar outer panel in order to reinforce a bracket facing a center pillar out of brackets which couple both tip ends of a door impact beam lengthwise disposed within front/rear doors to left/right tip end portions of an inner panel.

BRIEF DESCRIPTION OF THE DRAWINGS

For fuller understanding of the nature and objects of the invention, reference should be made to the following detailed description taken in conjunction with the accompanying drawings in which:

FIG. 1 is a side view of a vehicle;

FIG. 2 is a sectional view of an impact absorption apparatus according to the present invention disposed in a center pillar taken along a line A—A in FIG. 1;

FIG. 2a is an expanded view of circle 2a of FIG. 2.

FIG. 3 is a sectional view for illustrating an operational state of a supporting bar according to an embodiment of the present invention;

FIG. 4 is a sectional view taken along a line B—B in FIG. 3;

FIG. 5 is a sectional view taken along a line C—C in FIG. 3;

DETAILED DESCRIPTION OF THE INVENTION

Figure 6:
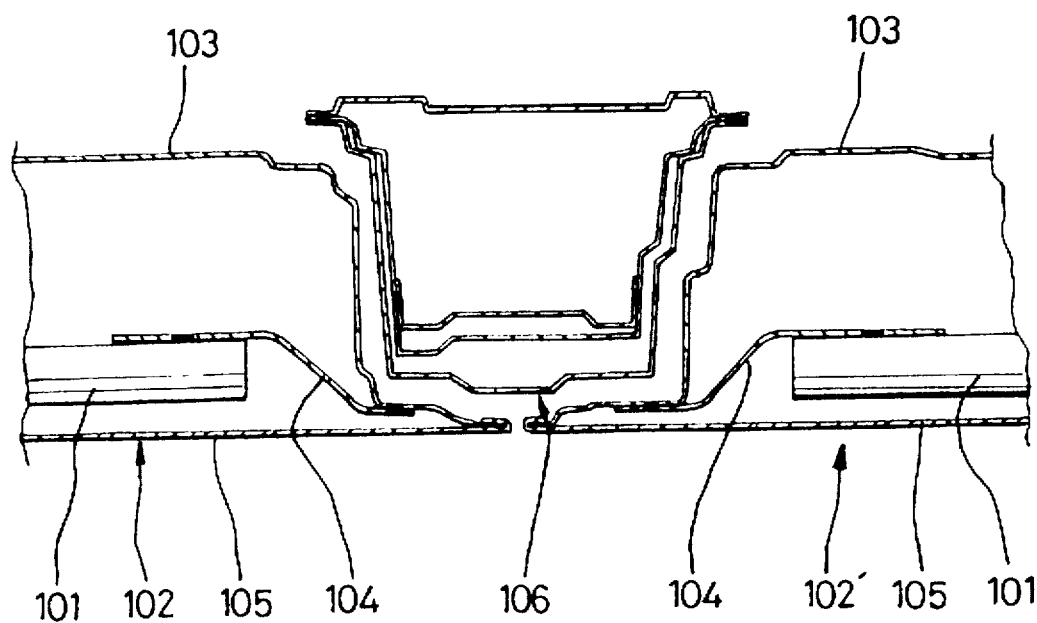
FIG. 6 is a sectional view for illustrating a center pillar of a body of a vehicle according to the prior art which corresponds to a section taken along a line A—A in FIG. 1.
Figure 7:
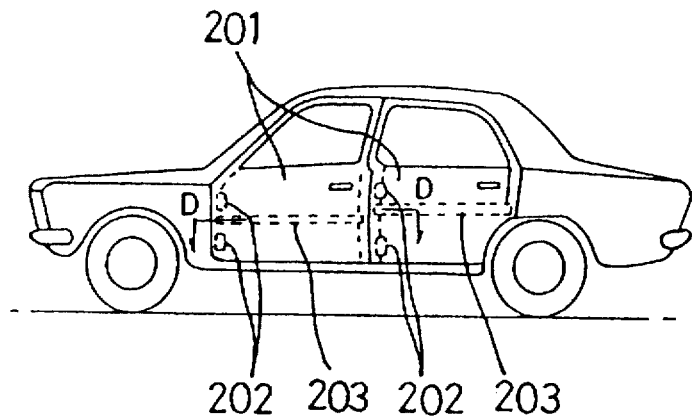
FIG. 7 is a side view of a vehicle mounted with a door impact beam according to the prior art.
Figure 8:
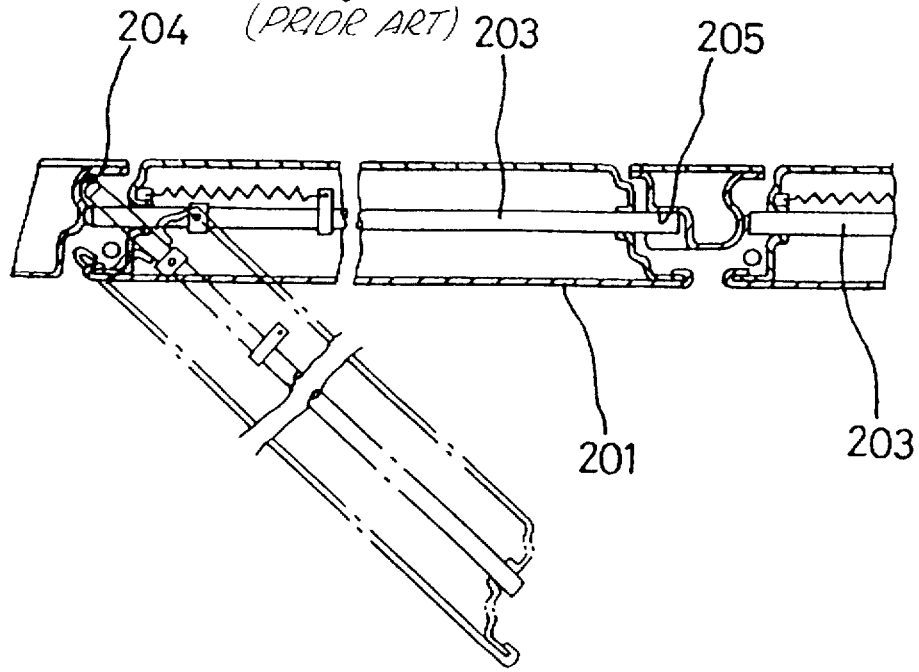
FIG. 8 is a sectional view taken along a line D—D in FIG. 7.

Now, the preferred embodiment of the present invention will be described with reference to the accompanying drawings.

As illustrated in FIGS. 1 through 5, the vehicle door impact absorption apparatus according to the present invention is a structural reinforcement of door impact beams 4 and 4' lengthwise disposed within doors 1 and 1' mounted at front and rear areas of the left and right sides of the body. The impact beams 4 and 4' are fixed at both tip ends through a media of flat-bodied brackets 3a, 3b, 3c and 3d, and welded to the left and right tip ends of the inner panel 2.

In other words, the present invention serves to reinforce the structural strength of the tip end portions of the door impact beams 4 and 4', respectively located within the front and rear doors, 1 and 1', toward a center pillar 5.

In order to achieve the object of the present invention, the door impact absorption apparatus comprises two hollow supporting bars 7 and 7' containing a coil spring 6 that can be inserted into the center pillar 5.

The supporting bars 7 and 7' are inherently disposed in a supporting bar accommodation space unit 12 which is formed with a reinforcing member 10 and a bracket 11 integrally coupled to form a closed space between a center pillar outer panel 8 and a center pillar inner panel 9.

In other words, the supporting bar accommodation space unit 12 includes the reinforcing member 10 integrally engaged to the ends of the center pillar outer panel 8 and the center pillar inner panel 9, and the closed space formed by the bracket 11 engaged to the reinforcing member 10.

Furthermore, the reinforcing member 10 and the center pillar outer panel 8, which are two portions of the supporting bar accommodation space unit 12, are respectively formed with holes 13a and 13b, against which holes 13c and 13d are respectively formed at the left and right portions of the inner panel 2 of the front and rear doors 1 and 1'.

The supporting bars 7 and 7' are retained relative to an inner wall of the center pillar outer panel 8 along with a torsion spring 14. One end of the stoppers 16 and 16' simultaneously penetrate the center pillar outer panel 8 and the reinforcing member 10, and protrude externally. Meanwhile, the other end of the stoppers 16 and 16' is supported to a hole 15 piercing through supporting bars 7 and 7'.

When the outer panel 2' of the front and rear doors 1 and 1' is pushed into the door, deforming the outer panel 2', a tip end of the stoppers 16 and 16' retained relative to an inner wall of the center pillar outer panel 8 along the torsion spring 14 is pressurized and rotated. This causes the other end of the stoppers 16 and 16' to be displaced from the hole 15 formed through supporting bars 7 and 7'.

At this time, supporting bars 7 and 7', which were restricted by stoppers 16 and 16' from expanding horizontally, are burst open horizontally by the restoring force of the inherently-disposed coil spring 6. This causes the supporting bars 7 and 7' to enter the cavity of the doors 1 and 1' through holes 13a and 13b respectively formed at the outer panel 8, and holes 13c and 13d formed at the inner panel 2 of the front and rear doors 1 and 1'.

When supporting bars 7 and 7' are extended toward the brackets 3b and 3c that attach the door impact beams 4 and 4' to the inner panel 2, the supporting bars 7 and 7' serve to reinforce the structural strength of the brackets 3b and 3c that secure one end of the center pillar at door impact beams 4 and 4'.

Supporting bars 7 and 7' are respectively formed at a peripheral surface with protruders 17 and 17'. When the supporting bars 7 and 7' expand horizontally by a restoring force of the coil spring 6 caused by rotation of stoppers 16 and 16' upon impact, protruders 17 and 17' make inroads into doors 1 and 1' through holes 13a and 13b at the outer panel 8, and holes 13c and 13d at doors 1 and 1'. The insertion distance of the supporting bars 7 and 7' defined by the location of protruders 17 and 17' prevents the supporting bars 7 and 7' from breaking away into an external area of the supporting bar accommodation space unit 12, allowing them to exercise their proper function.

The two tip ends of the door impact beams 4 and 4' and the tip ends of brackets 3b and 3c engaged thereto are concavely formed to accommodate the supporting bars 7 and 7' when they are protruded, as illustrated in FIG. 4. More particularly, brackets 3b and 3c directly contacting the supporting bars 7 and 7' are concavely formed with a concave unit 18 to attain the appearance shown in FIG. 4.

The door impact beams 4 and 4' not directly in touch with the supporting bars 7 and 7' and brackets 3a, 3b, 3c and 3d engaged to two tip ends as illustrated in FIG. 5, are respectively formed in semi-circular arch shapes in order to enlarge the contact area and improve a junction force between them when engaged with the door impact beams 4 and 4'.

Now, a detailed description of the operation of the door impact absorption apparatus according to the embodiment of the present invention is appropriate.

When impact is applied to doors 1 and 1' during a side impact collision, the door impact beams 4 and 4' absorb the impact. At the same time, the lateral surfaces of doors 1 and 1' near the center pillar apply the impact to stoppers 16 and 16', compressing the torsion spring and rotating the stoppers 16 and 16'.

One end of the stoppers 16 and 16' slip out of the hole 15 formed at the supporting bars 7 and 7', causing the coil spring 6 inherently disposed between the supporting bars 7 and 7' to exercise an elastic force and cause the supporting bars to be protruded externally through the holes 13a, 13b, 13c and 13d formed at the center pillar outer panel 8, reinforcing member 10, and inner panel 2.

The portion of the supporting bars 7 and 7' which have entered the interior of the front and rear doors 1 and 1' prevent brackets 3b and 3c which support the tip end of the impact beams 4 and 4' from being deformed.

Furthermore, brackets 3b and 3c which are kept from being deformed by supporting bars 7 and 7' can effectively distribute the impact applied to the body of the vehicle from side impact collision to the center pillar 5, providing passengers with greater safety.

As apparent from the foregoing, an advantage of this vehicle door impact absorption apparatus, is that supporting bars acting as a door impact absorption apparatus are disposed at a center pillar causing the bars to be protruded during side impact collisions thereby supporting a tip end of the door impact beams in a door cavity, so that brackets supporting the two tip ends of the door impact beams are saved from being deformed. At the same time, the impact can be distributed to a center pillar to effectively absorb the side impact.

Another advantage is that a sufficient absorption of the impact during side impact collisions can restrict an intrusion into the door to provide increased protection for the vehicle occupants during such side impact collisions.

What is claimed is:

1. A vehicle door impact absorption apparatus, comprising two hollow supporting bars with a coil spring at an interior of a center pillar, said coil spring being resiliently inserted in said supporting bars and fixed by a stopper protruding outside of an outer panel of the center pillar in order to reinforce one of two brackets facing the center pillar, each of the brackets being disposed in one of a front and rear door, and coupling a door impact beam lengthwise to an inner panel of its respective door.

2. The apparatus as defined in claim 1 wherein the supporting bars are disposed in a supporting bar accommodation space unit comprising a reinforcing member and a bracket, the accommodation space unit being located between an inner panel and an outer panel of the center pillar.

3. A vehicle door impact absorption apparatus as defined in claim 1 wherein the supporting bars are coupled to an inner wall of the outer panel of the center pillar by the stopper, said stopper being hinged on a torsion spring, one end of the stopper protruding outside of the outer panel of the center pillar and the other end of the stopper being fixedly secured through a hole in the supporting bars.

4. A vehicle door impact absorption apparatus as defined in claim 3 wherein the supporting bars are formed with protruders so as to define an insertion distance when the supporting bars enter a cavity of one of said doors through holes in the outer panel of the center pillar and a hole in one of said doors.

5. A vehicle door impact absorption apparatus as defined in claim 2 wherein the reinforcing member and the outer panel of the center pillar are formed with holes, and the inner panel of each of the front and rear doors are also formed with holes.

6. A vehicle door impact absorption apparatus as defined in claim 1 wherein one end of the door impact beam has a semi-circular arc, and a bracket facing the end of the door impact beam is concave.

7. A vehicle door impact absorption apparatus for a vehicle having front and rear doors separated by a center pillar, comprising:

a door impact beam disposed in each of the front and rear doors;

first and second supporting bars disposed in the center pillar;

a coil spring for biasing the first and second supporting bars apart; and a stopper for releasably holding the first and second supporting bars together, said supporting bars being released upon impact to the stopper to allow each of the supporting bars to extend into a different one of the doors due to the biasing of the coil spring thereby reinforcing the door impact beams.

8. The apparatus of claim 7 wherein each of the supporting bars comprises a hollow cylinder, said coil spring being disposed in the interior of the hollow supporting bars.

9. The apparatus of claim 7 wherein the center pillar comprises a panel having a first hole to allow the first supporting bar to extend into the front door, and a second hole to allow the second supporting bar to extend into the rear door.

10. The apparatus of claim 9 further comprising a reinforcing member disposed between the supporting bars and the panel, said reinforcing member having a first hole aligned with the first hole of the center pillar panel to allow the first supporting bar to extend into the front door, and a second hole aligned with the second hole of the center pillar panel to allow the second supporting bar to extend into the rear door.

11. The apparatus of claim 10 further comprising a bracket connected to the reinforcing member, said supporting bars being disposed between the bracket and reinforcing member.

12. The apparatus of claim 9 wherein each of the doors comprises a panel having a hole, said hole in the front door panel being aligned with the first hole in the center pillar to allow the first supporting bar to extend into the front door, and said hole in the rear door panel being aligned with the second hole in the center pillar to allow the second supporting bar to extend into the rear door.

13. The apparatus of claim 7 wherein each of the doors comprises a panel, and further comprising a first bracket for coupling the front door panel to its respective door beam, and a second bracket for coupling the rear door panel to its respective door beam.

14. The apparatus of claim 13 wherein each of the door impact beams form a semi-circular arc and each of the brackets are concave.

15. The apparatus of claim 7 wherein the stopper has a first end penetrating the center pillar and a second end penetrating the first supporting bar, said stopper being hinged on a torsion spring.

16. The apparatus of claim 15 further comprising a second stopper having a first end penetrating the center pillar and a second end penetrating the second supporting bar, said stopper being hinged on a torsion spring.

17. A center pillar for a vehicle, comprising:

first and second supporting bars;

a coil spring for biasing the first and second supporting bars apart; and a stopper for releasably holding the first and second supporting bars together, said supporting bars being released upon impact to the stopper to allow each of the supporting bars to move apart due to the biasing of the coil spring.

18. The center pillar of claim 17 wherein each of the supporting bars comprises a hollow cylinder, said coil spring being disposed in the interior of the hollow supporting bars.

19. The center pillar of claim 17 further comprising a panel having a first hole to allow the first supporting bar to extend out of the center pillar, and a second hole to allow the second supporting bar to extend out of the center pillar.

20. The center pillar of claim 19 further comprising a reinforcing member disposed between the supporting bars and the panel, said reinforcing member having a first hole aligned with the first hole of the panel to allow the first supporting bar to extend out of the center pillar, and a second hole aligned with the second hole of the panel to allow the second supporting bar to extend out of the center pillar.

21. The center pillar of claim 20 further comprising a bracket connected to the reinforcing member, said supporting bars being disposed between the bracket and reinforcing member.

22. The center pillar of claim 17 wherein the stopper has a first end penetrating the center pillar and a second end penetrating the first supporting bar, said stopper being hinged on a torsion spring.

23. The center pillar of claim 22 further comprising a second stopper having a first end penetrating the center pillar and a second end penetrating the second supporting bar, said stopper being hinged on a torsion spring.

* * * * *